2,868,196
DUST FILTER MASK

Gerhard K. E. H. Stampe, Lubeck, Germany, assignor to Otto Heinrich Drager, Lubeck, Germany Application August 18, 1954, Serial No. 450,770

Claims priority, application Germany July 27, 1953

12 Claims. (Cl. 128—146)

This invention relates to respirators. Especially the invention is directed toward an improved dust filter.

Dust filters of the type considered herein ordinarily are composed of a half-mask which may either support a dust filter in the front portion of the mask or have a dust filter mounted on one or both sides of the mask. In order that the filter is not too heavy, nor too large, to interfere with the field of vision, the filter should be as small as possible. However, as the surface area of the dust filter is small, the filter offers a high resistance to the air passing therethrough. Accordingly, the surface area of dust filters is customarily increased by corrugating the surface, thus increasing the surface area. However, the problems of eliminating the obstruction of vision by the filter and the reduction in weight thereof are still prevalent. In one prior embodiment dust filters were arranged on both sides of the mask at about chin level, but these dust filters were composed of two superimposed layers of woven fabric which filtered only coarse dust particles from the air. Other embodiments are such as are disclosed in my copending applications, Serial Numbers 402,201, filed January 5, 1954, now Patent No. 2,811,967, 408,937, filed February 8, 1954, and 431,054, filed May 20, 1954 (which is now abandoned), in which the coarse dust filter encircled the neck portion of the wearer with the fine dust filter being mounted between the coarse dust filter and the face mask.

The objects of the instant invention are to increase the effective surface area of the fine dust filter without obscuring the vision of the wearer of the mask; to produce such increase in surface area without any objectional increase in the weight of the filter unit; and to increase the effective surface area of the coarse filter.

In general, these objects are accomplished by placing the fine dust filter in a container arranged adjacent the lower portion of the cheek portion of the face mask, with the coarse dust filter constituting a tube-shaped member connected to the fine dust filter. The center of the container for the fine dust filter is mounted on the face mask so that it is approximately at mouth level, and in this position the filter can be large enough so that it has an adequate filter area and yet not so large as to interfere with the field of vision of the wearer. Thus, the fine filter container is mounted more toward the ears of the wearer as compared to prior masks. The container, preferably made of sheet metal, synthetic material or the like, may be permanently fixed to or movably detachable from the face mask. The effective coarse filter area is increased by forming the cover of the fine filter container in part of an extension of the tubular coarse filter.

The means by which the objects of the invention are obtained are described more fully with reference to the accompanying drawings in which.

Figure 1:
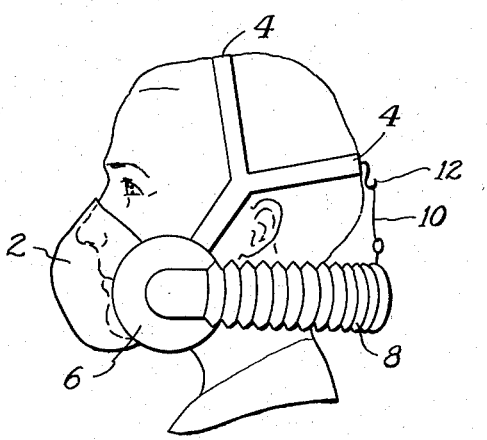
Figure 1 is a schematic side view of a dust filter constructed according to the invention.

In Figure 1 the half-face mask 2 is supported on the face of the wearer by head straps 4 as shown. Mounted on the face mask as rearwardly as possible toward the ears of the wearer is a fine filter container 6, said container being located adjacent the cheek of the wearer, and being of such diameter as to not interfere with the field of vision of the wearer. The center of container 6 is at about mouth level. The fine dust filter has a form such as disclosed in Figures 3 and 4 herein or in my aforesaid application, Serial No. 431,054. The top of the container can be affixed to the base thereof by screw threads, bayonet joints, latches or the like.

Extending from container 6, and secured thereto by a suitable fitting is tubular coarse filter 8. The tube 8 is accordion pleated so as to increase the effective surface area thereof, and as shown in Figure 1, may encircle the neck so as to have its other end attached to a container mounted on the opposite side of the face mask. The rearmost portion of coarse filter 8 can be supported by means of a strap 10 connected to a hook 12 secured to head strap 4, or may be directly supported by hooking the eye to the hook as shown in my aforesaid application, Serial No. 431,054. Moreover, the coarse filter 8 may be self-supporting by incorporating a spring therein as shown in my aforesaid application, Serial No. 408,937.

Due to the change in position of the fine dust filter container 6 from toward the front of the mask to a position near the ears of the wearer, the container can be increased in diameter so as to lie over the cheek area, or even more without obscuring the vision of the wearer. Clearly, the location of the coarse dust filter will not interfere with the field of vision.

Figure 2:
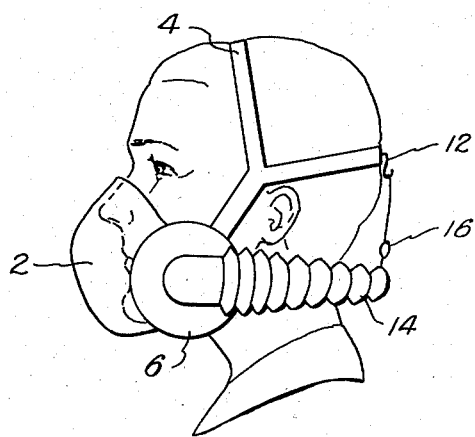
Figure 2 is a similar view showing a modified form of coarse filter.

In Figure 2 the half-face mask 2 is again supported by head straps 4 and has mounted thereon the fine dust filter 6. However, the coarse dust filter 14 is composed of a single conically shaped tube with accordion pleats. On the rear end of this tube is an eye 16 which is adapted to be connected by strap to the hook 12 on head strap 4, thus supporting filter 14. A similar tube may be mounted on a container fastened to the opposite side of the mask. When two such tubes 14 are used, the rearward ends of the same may be joined by a strap, which strap in turn may be supported from hook 12.

Figure 3:
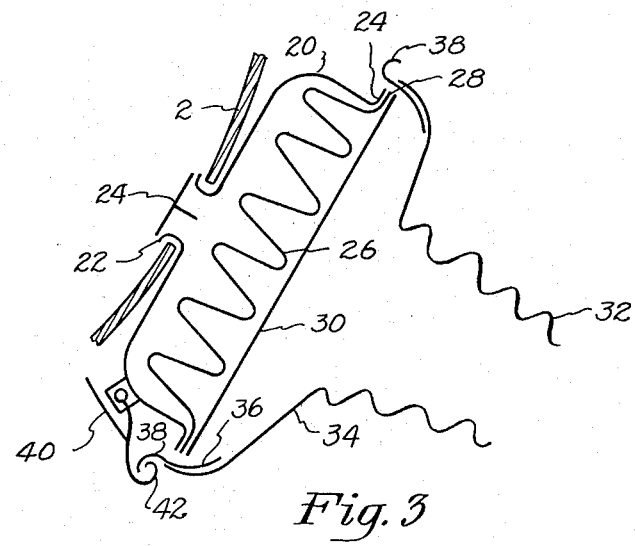
Figure 3 is a diagrammatical cross-sectional view through fine filter container.
Figure 4:
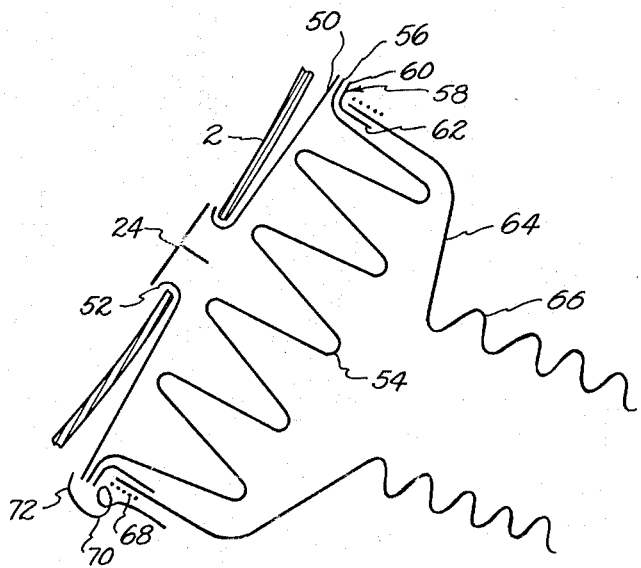
Figure 4 is a similar view through a modification.

Figures 3 and 4 illustrate how the structural advantages of forms of invention shown in Figures 1 and 2 can be not only maintained, but further improved by increasing the effective surface area of the coarse filter. In Figure 3 a face mask 2 has a bowl shaped fine filter container 20 attached thereto by means of rebent flange 22. A check valve 24 is mounted in the opening in the mask. The outer edge of bowl 20 terminates in an outwardly extending flange 24. Corrugated fine filter 26 is placed in bowl 20, said fine filter having an outwardly directed flange 28 which overlies flange 24, and which is surmounted by a washer or gasket 30. The tube-like coarse filter 32 has its end outwardly flared to form a conical portion 34 which is attached by any suitable means to the curved ring-like member 36 adapted to overlie gasket 30 and hold fine filter 26 in place. Ring member 36 has an outer rolled edge 38. A toggle action latch 40 is mounted on the side of the bowl member 20 and has a hook end 42 adapted to lock with the rolled edge 38. By using the coarse filter material portion 34 as part of the cover for the fine filter container the effective coarse filter area is increased.

In Figure 4 the fine filter container is formed as follows. A flat disc base plate 50 is attached to the face mask 2 by means of a rebent edge 52. Fine dust filter 54 has an outwardly extending flange 56 which is coextensive with and rests upon the outer portion of plate 50. An angle shaped collar 58 has one flange 60 resting upon flange 56, will hold the same in place, and a flange 62 connected to the outwardly flared portion 64 of coarse filter 66, by means of a suitable binding 68. A spring latch 70 connected to collar 58 has a latching end 72 adapted to hook over the edge of plate 50 to connect the members together. As in Figure 3 the coarse filter portion 64 effectively increases the surface area of the coarse filter.

The particular fastening means for the various members as shown in Figures 3 and 4 may be replaced by bayonet, screw threads, or other conventional forms of joints. When the coarse filter is in the form of encircling the neck, it may also serve for the purpose of a loop to hold the mask loosely upon the shoulder of the wearer when the mask is not being used. Again, when the coarse filters are in the form of individual tubes, the end of the tubes can be connected by a strap to form a loop for a similar purpose.

Having now described the means by which the objects of the invention are obtained, I claim:

1. A dust filter comprising a face mask, a filter container mounted on said mask so as to extend over the cheek of a wearer thereof and having its center at about mouth level, said container communicating with the interior of said mask and having a fine dust filter mounted therein, and a tubular coarse dust filter connected to said container outwardly of said fine dust filter and longitudinally extending in the direction of the neck of a wearer of said mask.

2. A dust filter as in claim 1, further comprising a similar container with a fine dust filter therein mounted on the opposite side of said face mask.

3. A dust filter as in claim 2, each coarse dust filter further comprising in part a portion of the cover for its respective container.

4. A dust filter as in claim 1, said container further comprising a base plate attached to said mask, a fine dust filter mounted on said plate, collar means secured to said coarse dust filter, and latch means for detachably connecting said collar means to said base plate.

5. A dust filter as in claim 4, the portion of said coarse dust filter adjacent said collar means further comprising a portion of the cover for said container.

6. A dust filter as in claim 5, said collar member further comprising stiffening member means for said container.

7. A dust filter as in claim 6, said latch means further comprising lever actuated latches.

8. A dust filter as in claim 7, further comprising means for removably securing said coarse dust filter to a garment.

9. A dust filter as in claim 1, further comprising a similar container with a fine dust filter therein on the opposite side of said mask, with said coarse dust filter extending continuously between the two containers.

10. A dust filter as in claim 1, further comprising self-supporting means for said coarse dust filter.

11. A dust filter as in claim 1, said coarse dust filter further comprising an accordion pleated tube.

12. A dust filter as in claim 1, further comprising joint means for detachably securing said coarse dust filter to said container.

References Cited in the file of this patent

UNITED STATES PATENTS

| | | |
|---|---|---|
| 533,854 | Loeb | Feb. 5, 1895 |
| 1,048,135 | Cloetta et al. | Dec. 24, 1912 |
| 1,491,674 | Coletti | Apr. 22, 1924 |
| 2,652,828 | Matheson | Sept. 22, 1953 |

FOREIGN PATENTS

| | | |
|---|---|---|
| 27,118 | Great Britain | Nov. 28, 1896 |
| 768,860 | France | May 28, 1934 |
| 89,613 | Sweden | June 29, 1937 |
| 976,720 | France | Nov. 1, 1950 |
| 501,167 | Belgium | Feb. 28, 1951 |